(12) United States Patent
Santos et al.

(10) Patent No.: US 8,064,454 B2
(45) Date of Patent: Nov. 22, 2011

(54) PROTOCOL INCOMPATIBILITY DETECTION

(75) Inventors: David L. Santos, Granite Bay, CA (US); Sundeep S. Nagra, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 444 days.

(21) Appl. No.: 12/110,411

(22) Filed: Apr. 28, 2008

(65) Prior Publication Data

US 2009/0268728 A1 Oct. 29, 2009

(51) Int. Cl.
*H04L 12/28* (2006.01)
*H04L 12/56* (2006.01)
(52) U.S. Cl. .................... 370/392; 370/465; 709/224
(58) Field of Classification Search .................. None
See application file for complete search history.

(56) References Cited

U.S. PATENT DOCUMENTS

| | | | | |
|---|---|---|---|---|
| 6,130,917 A * | 10/2000 | Monroe | | 375/295 |
| 6,453,360 B1 * | 9/2002 | Muller et al. | | 709/250 |
| 2005/0002417 A1 * | 1/2005 | Kelly et al. | | 370/466 |
| 2005/0021740 A1 * | 1/2005 | Bar et al. | | 709/224 |
| 2005/0097212 A1 * | 5/2005 | Engel et al. | | 709/230 |

* cited by examiner

*Primary Examiner* — Chirag Shah
*Assistant Examiner* — Suk Jin Kang

(57) ABSTRACT

A network switch configured to detect protocol incompatibility and a corresponding method are described. The switch comprises one or more network ports and a memory. The memory stores a protocol set comprising one or more protocols each comprising protocol-specific identifying information and one or more actions to be taken by the network switch upon detection of the particular protocol. The memory also stores a protocol packet detection logic configured to perform at least one of the one or more actions responsive to detection of a corresponding protocol.

14 Claims, 3 Drawing Sheets

PROTOCOL INCOMPATIBILITY DETECTION

BACKGROUND

Often in network switch environments, protocols that are similar in function, but incompatible in operation, are used unknowingly by network administrators which can cause unpredictable network behavior that is hard to diagnose and can be costly to remedy. For example, Service Providers in some occasions do not have control over or knowledge of the configuration of customer switches that connect into their network. If a customer switch is running a proprietary version of a protocol, e.g., PVST/PVST+ that is incompatible with the standard version 802.1s (MSTP) running on the Service Provider network, layer 2 connectivity problems may occur in the network.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
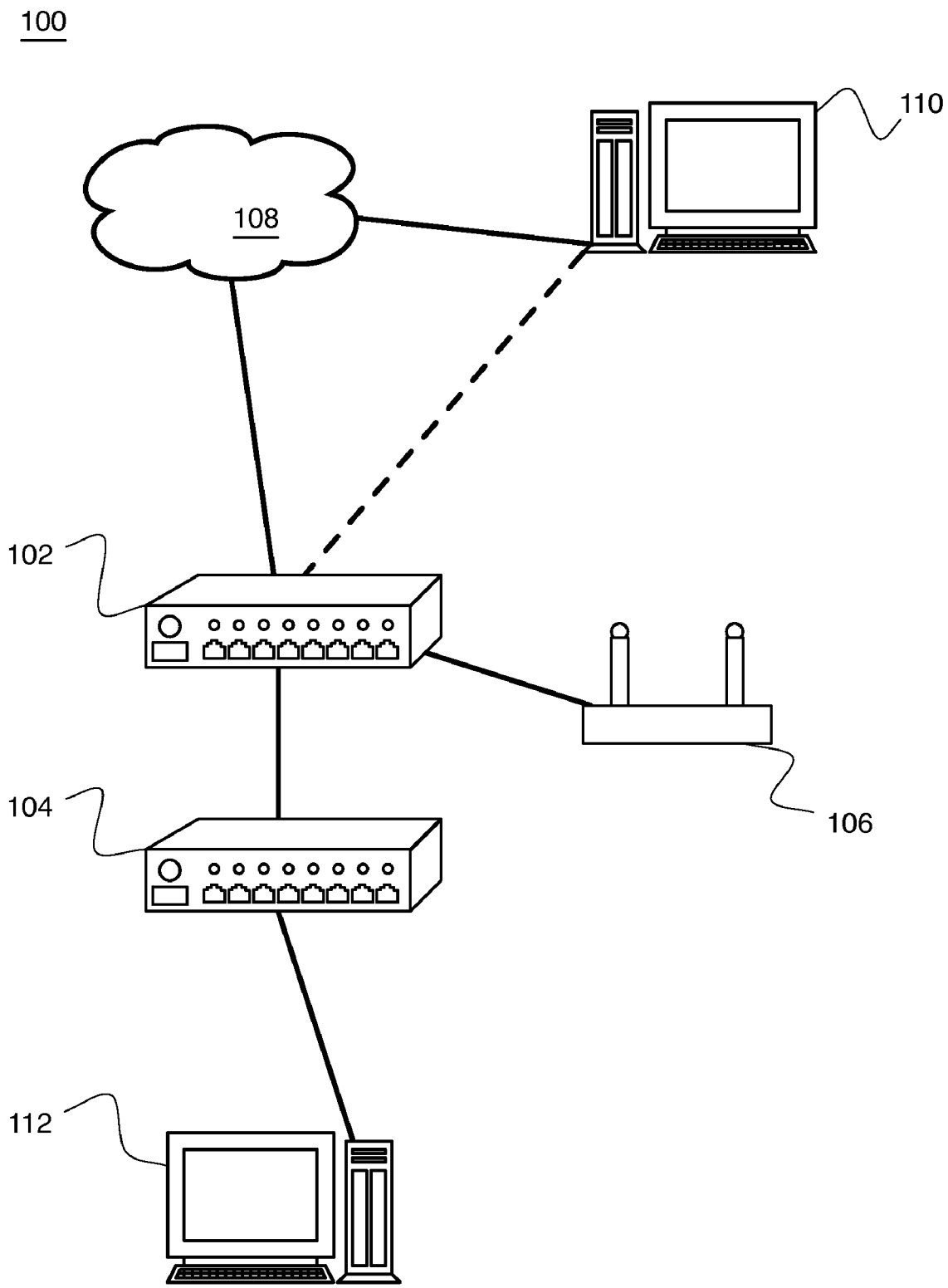
FIG. 1 is a high-level block diagram of a network environment.

FIG. 1 depicts a high-level block diagram of a network environment 100 in conjunction with which an embodiment of the present invention may be operated to advantage. Network environment 100 comprises a protocol incompatibility detecting (PID) network switch 102 communicatively coupled to a non-PID network switch 104, a wireless access point 106, and an additional network 108. PID network switch 102 is also depicted as optionally communicatively coupling with an administrator computer system 110. In at least some embodiments, PID network switch 102 may be communicatively coupled with administrator computer system 110 via a direct connection, i.e., either wired and/or wireless, and/or via a network connection, e.g., as depicted in FIG. 1 via additional network 108.

Network environment 100 also comprises a user computer system 112 communicatively coupled with non-PID network switch 104.

In at least some embodiments, one or more elements of network environment 100 may be added or removed without impacting operation of PID network switch 102. In at least some embodiments, network environment 100 may comprise wired and/or wireless connections.

Each of the devices comprising network environment 100 communicate, i.e., transmit and/or receive, data packets with other devices of the network environment. In at least some embodiments, the devices communicate data packets with devices which are a part of additional network 108 and/or communicatively coupled with the additional network.

In a given scenario, user computer system 112 communicates using a different, and incompatible, protocol from a protocol used by user computer system 114, non-PID network switch 104, etc., which results in degraded network performance and loss of time due to troubleshooting efforts to identify and resolve the issue.

According to at least one embodiment, PID network switch 102 operates to detect the use of incompatible protocols in network environment 100. In at least some embodiments, PID network switch 102 stores an indication of detection of incompatible protocols, e.g., the switch logs an incompatibility detection. In at least some embodiments, PID network switch 102 alerts a user to the detection of incompatible protocols and/or transmits an indication of incompatible protocol detection to a computer system, e.g., administrator computer system 110 or user computer system 112. In at least some embodiments, PID network switch 102 disables the port from which the switch detected the incompatible protocol and thereby prevents transmission and/or reception of further incompatible protocol packets.

Figure 2:
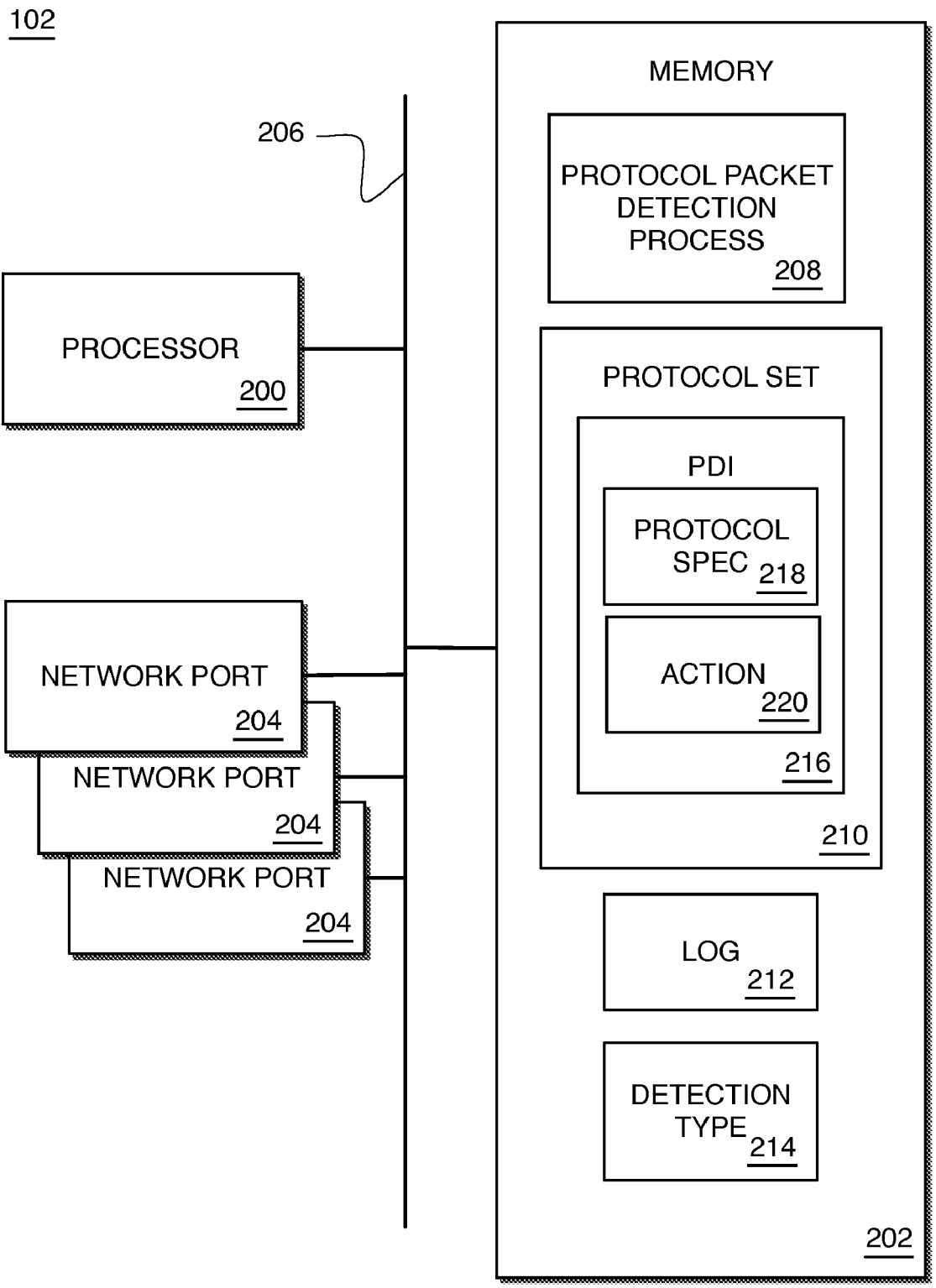
FIG. 2 is a high-level functional block diagram of a network switch according to an embodiment.

FIG. 2 depicts a high-level functional block diagram of PID network switch 102 comprising a processor 200, a memory 202, and one or more network ports 204, and a bus 206 communicatively coupling the processor, memory and network ports. In at least some embodiments, processor 200 may be an application specific integrated circuit (ASIC) or other controller circuit for implementing the functionality switch 102.

Memory 202 (also referred to as a computer-readable medium) may comprise a random access memory (RAM) or other dynamic storage device, coupled to the bus 206 for storing data and instructions to be executed by processor 200, e.g., a protocol packet detection process (PPDP) 208, a protocol set 210, a log 212, and a detection type 214. In at least some embodiments, log 212 and detection type 214 are optional components.

Memory 202 comprises a set of instructions comprising the protocol packet detection process (PPDP) 208 which, when executed by processor 200, causes the processor to perform functionality according to an embodiment.

Memory 202 also comprises a collection of information about protocols to be detected by PID network switch 102, i.e., protocol set 210. In at least some embodiments, protocol set 210 comprises predetermined information about protocols determined to be incompatible with a predetermined set of protocols to be supported by PID network switch 102.

In at least some embodiments, a user, e.g., an administrator at administrator computer system 110 connected to PID network switch 102, specifies one or more protocols which are incompatible with an existing protocol or set of protocols supported by the PID network switch. In at least one alternative embodiment, protocol set 210 comprises information regarding protocols including incompatibility between a given protocol and other protocols and PID network switch 102 determines based on the incompatibility information whether incompatible protocols have been detected at the switch.

Protocol set 210 comprises protocol detection information (PDI) 216 for an incompatible protocol to be detected. In at least some embodiments, protocol set 210 may comprise more than one PDI 216. PDI 216 comprises a protocol specification 218 specifying a protocol and an action identifier 220 specifying whether an action is to be taken by PID network switch 102 upon detection of the protocol corresponding to the protocol specification.

In at least some embodiments, action identifier 220 may comprise one or more identifiers, e.g., a no action identifier, a log identifier, a lock down port identifier, a notify identifier, etc., or a combination of identifiers. A no action action identifier 220 causes PPDP 208 to take no action upon detection of an incompatible protocol corresponding to protocol specification 218. A log identifier action identifier 220 causes PPDP 208 to store an entry in log 212 recording a time and/or datestamp corresponding to the time and/or date at which the incompatible protocol was detected. In at least some embodiments, log identifier action identifier 220 may cause PPDP 208 to also store information indicating the detected protocol and/or information identifying the network port 204 which received the particular protocol packet. In at least some embodiments, other information pertinent to the protocol in question may be logged such as the version, frame length and other fields of interest in the protocol header. Also in some embodiments, the switch logs the source of the incompatible packet if possible, e.g., the source MAC address, etc. In certain cases, the switch also logs scenarios where a valid packet was received which violated the expected timing or retry attempts as specified by the semantics of the protocol.

A lock down port identifier action identifier 220 causes PPDP 208 to disable the network port 204 which received the incompatible protocol packet. A notify identifier action identifier 220 causes PPDP 208 to transmit a notification, e.g., in at least one embodiment a simple network management protocol (SNMP) object may be defined to transmit an SNMP trap notification to an administrator at administrator computer system 110, to a connected computer system or other device.

In at least some embodiments, action identifier 220 may further specify a particular action to be taken by PID network switch 102 upon detection of the specified protocol. In at least some embodiments, PPDP 208 determines that a detected protocol, i.e., corresponding to protocol specification 218 of a particular PDI 216, is an incompatible protocol based on the presence of a corresponding protocol specification in protocol set 210 and without requiring the action identifier 220. That is, In at least some embodiments, action identifier 220 may be an optional component.

Protocol specification 218 comprises a specification for identifying a particular protocol. In at least some embodiments, the protocol identification specification comprises common fields examined to determine a particular type of protocol, such as Ether-type, protocol version, well-known multicast media access control (MAC) used as the destination, user datagram protocol (UDP)/transmission control protocol (TCP) destination ports, etc.

In at least some embodiments, memory 202 also comprises log 212 for storing an indication of detected incompatible protocols at PID network switch 102. In at least some embodiments, log 212 comprises a time-ordered set of entries. In at least some embodiments, log 212 stores a record of an action taken responsive to detection of an incompatible protocol. In at least some embodiments, log 212 may be stored remote from PID network switch 102 and the PID network switch reads and/or writes to the log via a network or other communication connection, e.g., log 212 may be stored at administrator computer system 110, e.g., a syslog server.

In at least some embodiments, memory 202 also comprises detection type 214 for storing an indication of whether automatic or manual specification of protocols to be detected is to be executed by PID network switch 102, and PPDP 208 specifically. For example, an administrator at administrator computer system 110 may connect with PID network switch 102 and configure detection type 214 to indicate whether the PID network switch is to automatically determine, based on predetermined protocol set 210, whether a received packet or set of packets is incompatible or whether the PID network switch is to determine, based on a user-specified set of protocols, e.g., specified and stored in the protocol set, incompatibility.

Memory 202 also may be used for storing temporary variables or other intermediate information during execution of instructions to be executed by processor 200. Memory 202 may also comprise a read only memory (ROM) or other static storage device coupled to the bus 206 for storing static information and instructions for the processor 200.

Network ports 204 comprise a mechanism for connecting to another device such as administrator computer system 110, non-PID network switch 104, etc. In at least some embodiments, PID network switch 102 comprises a greater or fewer number of network ports 204 than depicted in FIG. 2.

Figure 3:
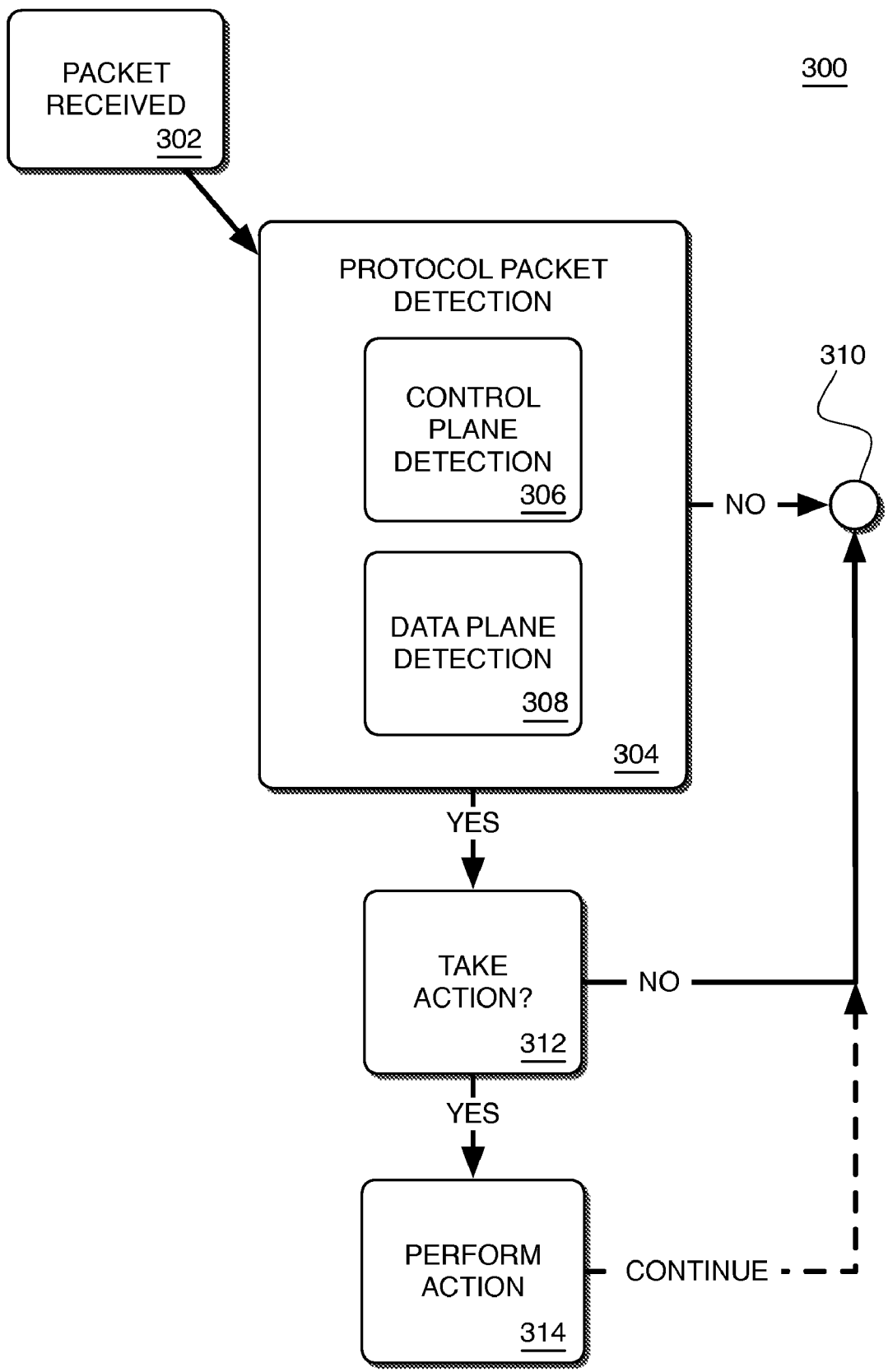
FIG. 3 is a high-level process flow diagram of an incompatible protocol detection method according to another embodiment.

FIG. 3 depicts a high-level process flow diagram of at least a portion of an incompatible protocol detection method 300, e.g., as embodied in PPDP 208, according to an embodiment. Responsive to receipt of a particular packet via network port 204, processor 200 executes a set of instructions to receive the packet for protocol incompatibility detection during packet received functionality 302. The flow proceeds to a protocol packet detection functionality 304.

During execution of protocol packet detection functionality 304, processor 200 executes a set of instructions to compare at least a portion of the received packet to protocol specification 218 of a protocol in protocol set 210. In at least some embodiments, the entirety of the received packet is compared to protocol specification 218. In at least some embodiments, the received packet is compared to each protocol specification 218 in protocol set 210. In at least some further embodiments, the received packet is compared to each protocol specification 218 until a match is found.

Protocol packet detection functionality 304 comprises a control level detection functionality 306 and a data level detection functionality 308. Control plane detection functionality 306 causes processor 200 to compare a control packet in the control plane received via network port 204 with protocol specification 218. Data plane detection functionality 308 causes processor 200 to compare a control packet in the data plane received via network port 204 with protocol specification 218.

To detect an incompatible control protocol, PID network switch 102 examines the protocol packets flowing through it, e.g., in either the control plane or the data plane. The control plane refers to packet communication handled by switch 102 in establishing and controlling protocols and routing for protocols which may involve execution of the processor 200. The data plane refers to packet communication handled by switch 102 in transferring packets according to an established protocol without requiring operation of processor 200, e.g., an application specific integrated circuit (ASIC) may be used to transfer received packets. In some cases, the packets are addressed to PID network switch 102 (i.e., the destination address of a packet matches the switch address or the packet is destined for a well-known multicast address to which the switch is listening, e.g., if the switch is participating in the protocol in question, and thus are examined by the protocol packet detection process 208. In other cases, when PID network switch 102 is not participating in the protocol in question and the packets of the protocol flow through the switch without being examined by the executed control software of the switch, specific filters are configured in the switch, e.g., in the ASIC data transfer portion, so that copies of the particular packets are made and provided for examination by the protocol packet detection process 208. After the control packet reaches the protocol packet detection process 208, the packet header is examined for fields as described above, e.g., the Ether-type, the protocol version, the destination address/destination TCP/UDP port, to determine if the packet belongs to a protocol which is incompatible with the version of the protocol currently running on the network.

In at least some embodiments, protocol packet detection functionality 304 comprises one or the other of control plane detection functionality 306 or data plane detection functionality 308.

If protocol packet detection functionality 304 determines that the received packet is not incompatible ("NO"), i.e., the received packet does not match a protocol specification 218, the flow proceeds to functionality 310 and PID network switch 102 transmits the packet in accordance with switch operation, i.e., retransmission of the packet per switching rules to one or more connected devices.

If protocol packet detection functionality 304 determines that the received packet is incompatible ("YES"), the flow proceeds to action determination functionality 312. During action determination functionality 312, processor determines based on the content of action identifier 220 of PDI 216 corresponding to the particular protocol specification 218 which was determined to match the received packet whether to take an action. If the result of the determination is not to take an action ("NO"), the flow proceeds to functionality 310, as described above.

If the result of the determination is to take an action ("YES"), the flow proceeds to perform action functionality 314. During execution of perform action functionality 314, the action specified in the action identifier 220 corresponding to the particular protocol specification 218 which was determined to match the received packet is performed. In at least some embodiments, after performing the action the flow proceeds to functionality 310 ("CONTINUE").

In accordance with the action identifier 220, PPDP 208 may: store an entry in log 212 recording information about the received packet, e.g., a MAC address of the transmitting device; disable the particular network port 204 which received the packet; take no action; discard the received packet; trigger a notification to a user such as an administrator; or a combination of actions.

In at least some embodiments, protocol packet detection process 208 examines detection type 214 to determine whether to consult a user-specified protocol set or a predetermined protocol set in order to determine incompatible protocols.

In at least some embodiments, protocol packet detection process 208 may be stored and/or executed on one or more different devices, e.g., a server, an administrator computer system 110 or user computer system 112, and/or another networked processing device.

What is claimed is:

1. A network switch configured to detect protocol incompatibility, the switch comprising:
    one or more network ports;
    a memory storing:
        a protocol set comprising protocol data information corresponding to a particular protocol, each protocol data information comprising:
            protocol-specific identifying information; and
        protocol packet incompatibility detection logic configured to perform an action responsive to protocol incompatibility detection based on an associated action identifier, via one of the one or more network ports, of a protocol corresponding to protocol-specific identifying information;
        a detection type specifying whether the protocol packet detection logic is configured to automatically or manually detect protocol incompatibility; and
        a log for storing scenarios where a valid packet was received which violated an expected timing or retry attempt number as specified by one or more semantics of the protocol.

2. The switch as claimed in claim 1, further comprising a processor connected with the one or more network ports and memory and wherein the protocol packet incompatibility detection logic comprises a collection of predetermined information about protocols determined to be incompatible and associated action identifiers stored in the memory.

3. The switch as claimed in claim 1, wherein the action performed comprises:
    disabling the network port related to the detected protocol incompatibility.

4. The switch as claimed in claim 1, wherein each protocol further comprises:
    one or more actions to be taken by the network switch upon detection of the particular protocol.

5. The switch as claimed in claim 4, wherein the one or more actions comprise at least one of:
    recording an entry corresponding to the detected protocol;
    generating a notification regarding the detected protocol; or
    disabling the network port related to the detected protocol.

6. The switch as claimed in claim 1, wherein the memory further stores:
    a log for storing an entry comprising information related to the detected protocol.

7. The switch as claimed in claim 1, wherein the protocol packet detection logic is configured to perform at least one of a control level detection or a data level detection on a received packet.

8. A method of detecting protocol incompatibility comprising:
    determining a protocol incompatibility at a network switch based on comparison of a received packet with protocol incompatibility information in response to receipt of a packet;
    performing an action, based on an action identifier associated with protocol incompatibility detection logic, responsive to a positive determination of protocol incompatibility; and
    storing in a memory:
        a detection type specifying whether the protocol packet detection logic is configured to automatically or manually detect protocol incompatibility; and
        a log for storing scenarios where a valid packet was received which violated an expected timing or retry attempt number as specified by one or more semantics of the protocol.

9. The method as claimed in claim 8, wherein the action performed comprises:
    disabling the network port related to the detected protocol incompatibility.

10. The method as claimed in claim 9, wherein recording an entry comprises storing an entry in a log where the entry comprises information related to the detected protocol.

11. The method as claimed in claim 9, wherein recording an entry comprises storing an entry in a log where the entry comprises a media access control address of a device which transmitted the received packet.

12. The method as claimed in claim 9, wherein generating a notification comprises generating a notification comprising a media access control address of a device which transmitted the received packet.

13. The method as claimed in claim 8, wherein the determining a protocol incompatibility comprises comparison of the received packet with protocol-specific identifying information.

14. A non-transitory memory or a computer-readable medium storing instructions which, when executed by a processor, cause the processor to:
  determine a protocol incompatibility at a network switch based on comparison of a received packet with protocol incompatibility information in response to receipt of a packet;
  perform an action, based on an action identifier associated with protocol incompatibility detection logic, where the action is responsive to a positive determination of protocol incompatibility; and
store, in a memory:
  a detection type specifying whether the protocol packet detection logic is configured to automatically or manually detect protocol incompatibility; and
  a log for storing scenarios where a valid packet was received which violated an expected timing or retry attempt number as specified by one or more semantics of the protocol.

* * * * *